`United States Patent` [19]

Thellmann et al.

[11] 4,239,557

[45] Dec. 16, 1980

[54] THERMALLY STABLE SINTERED POROUS METAL ARTICLES

[75] Inventors: Edward L. Thellmann, Walton Hills; Anton L. Gombach, Euclid, both of Ohio

[73] Assignee: Gould Inc., Rolling Meadows, Ill.

[21] Appl. No.: 868,693

[22] Filed: Jan. 11, 1978

Related U.S. Application Data

[63] Continuation of Ser. No. 644,124, Dec. 24, 1975, abandoned.

[51] Int. Cl.³ .......................... C21D 1/00; B22F 3/24; B22F 3/10; H01B 1/02
[52] U.S. Cl. ...................................... 148/126; 29/420; 29/420.5; 75/200; 75/211; 75/214; 75/222; 75/246; 252/512; 252/513; 252/515

[58] Field of Search ................. 75/222, 212, 226, 214, 75/211, 200, 246; 252/513, 512, 515; 148/126; 29/400, 420.5

[56] References Cited

U.S. PATENT DOCUMENTS

| | | | |
|---|---|---|---|
| 2,220,641 | 11/1940 | Davis | 75/222 X |
| 2,721,378 | 10/1955 | Oliver et al. | 75/222 X |
| 3,357,826 | 12/1967 | Honaker et al. | 75/222 X |

*Primary Examiner*—Richard E. Schafer
*Attorney, Agent, or Firm*—R. E. Baumann; E. E. Sachs

[57] ABSTRACT

A sintered porous metal article is provided which is essentially thermally stable at elevated temperatures. In addition, a method for producing such an article is also provided which method comprises preparing a blend of base metal particles and active dispersoid particles, forming the mixture into an article of the desired shape, and heating the so-formed article at sintering temperatures.

3 Claims, No Drawings

THERMALLY STABLE SINTERED POROUS METAL ARTICLES

This is a continuation of application Ser. No. 644,124, filed Dec. 24, 1975, now abandoned.

BACKGROUND OF THE INVENTION

The subject invention concerns porous sintered metal articles, preferably nickel articles, which are characterized by their thermal stability when subsequently heated to elevated temperatures, that is temperatures approaching that at which they were originally sintered.

In addition, the subject invention also concerns a unique method of producing the before-described type of article.

DESCRIPTION OF THE PRIOR ART

The formation of porous metal articles typically involves the steps of shaping metal powders into a green compact, for example, by loose packing, compaction, extrusion, rolling, or molding, and further consolidation of the green compact into the desired article by the mechanism of sintering.

In this general process, a quantity of loose starting material, usually irregularly shaped metal or metal alloy particles ranging in size from 0.1 microns to 200 microns, is used. The particles of the desired size are typically obtained by means of a sieve of predetermined mesh opening. The classified powders are then shaped by loose packing or under pressure into a green compact wherein the metal particles contact each other at many points and areas of their surfaces. In most cases, the interparticle voids left between the particles remain open to form interconnected pore channels penetrating the body of the compact. These openings are generally of irregular cross-section with jagged, sharp-edged walls. However, the green preform is mechanically weak due to insufficient bonding between the particles.

In order to enhance body strength, the green compact is sintered, that is, heated for a specific length of time at a temperature at which diffusion of metal is activated at the points of contact between the particles so that they become bonded to each other. As sintering progresses, the particle contacts grow to form neck-like joints and the pore channels assume a rounded, cylindrical shape due to surface tension forces acting on their surfaces. These forces also enhance diffusion flow of metal into the empty channels, decreasing their cross-sectional area to the point where the channels become unstable and reduce into spherical voids separated from each other by the body of densified metal.

To obtain a framework or structure with interconnecting pore channels, it is accordingly necessary to terminate sintering prior to pore channel breakdown. However, it is recognized that for irregularly shaped powder particles having a size distribution around an average value, the several stages of sintering occur at different times within the body of the compact. Closure of pore channels takes place sooner at some locations in the body than in others, causing gross inhomogeneities in the structure. It is therefore practically impossible by this technique to control pore size, strength and thermal stability of the finished structure. The minimum pore size within the wide range of pore sizes found in such a framework is generally limited by the size of metal particles. This restriction on minimum pore size is due to the surface tension forces causing pore closure which are inversely proportional to the diameter of the pore. The stability of the open channels decreases sharply with diameter. This results in inherent shrinkage in the framework throughout further heat treatment.

Several modifications of the conventional sintering technique have been utilized by the art in an attempt to more closely control the structure of the formed framework. Some of these modified processes suffer disadvantages and, in common with the basic technique, do not inhibit shrinkage in further heat treatment applications of the sintered structure.

By one such conventional technique, carefully sized, spherical powders are utilized to form the porous body with the choice of particle size determining the pore diameter of the interconnected channels. For pore diameters larger than about 5 microns, sintering can be terminated prior to breakdown of the pore channels since particles uniform in size and shape sinter uniformly. Growth of interparticle joints, formation, and shrinkage of cylindrical channels, and their eventual breakdown into separated voids, accordingly occur in the same sequence throughout the whole compact. A major disadvantage of this technique, in addition to the limitation on pore size, is the cost and avilability of spherical particles. Illustrative processes are disclosed in German Patent No. 918,357 (1954) and Japanese Patent No. 203,580 (1953) dealing with self-lubrication bearings, and U.S. Pat. No. 2,863,562 (1958) dealing with porous filters. By another conventional technique, pore-forming materials which volatilize during sintering are blended with the initial powder mixture of the more conventional nonuniform particles. Upon completion of the sintering operation, the resultant body will contain pore channels everywhere the pore formerly initially resided. By virtue of the nonuniformity of the initial metal particles, the resultant framework contains a large size distribution of interconnected channels. Illustrative processes are disclosed in U.S. Pat. Nos. 2,721,378 (1955); 2,792,302 (1957); and 2,877,114 (1957).

Both of the above techniques require precise control of sintering conditions to ensure termination thereof prior to pore channel breakdown.

One recently developed technique, where a dispersed phase of critical amounts of inert dispersoid particles of specified size are incorporated in sintered metal or metal alloy, approximates controlling the pore size, its distribution, and shrinkage inhibition. To be effective, the inert particles must form with the sintered particles a wetting angle of at least 90° as measured from the sintered metal-dispersoid particle interface to the sintered metal-atmosphere interface. The resulting materials exhibit a network of stabilized interconnected pore channels of narrow size distribution.

Particles of any shape can be used in the matrix so long as the voids remaining between them after they have been loosely packed or pressed together form interconnected pore channels penetrating the body of the compact. This process, as it is described in U.S. Pat. No. 3,397,968, has certain critical disadvantages, specifically, sintered metal articles produced by the concerned technique exhibit limited electrical conductivity. Accordingly, when it is desired to provide a thermally stable sintered porous metal article which is conductive, the technique of U.S. Pat. No. 3,397,968 cannot be used.

The instant invention provides a means of overcoming various limitations found in prior art methods of producing sintered porous metal articles. Specifically, the instant invention provides sintered porous metal articles which are both thermally stable and characterized by their degree of electrical conductivity. Such articles have a myriad of uses, such as, for example, high temperature heating elements, conductive metallic grids which are to be utilized at high temperature, electrodes for fuel cells (especially high temperature fuel cells), and as conductive elements for high temperature electrostatic precipitators. These uses are not exclusive, but are merely set forth herein as typical examples.

SUMMARY OF THE INVENTION

The instant invention concerns a unique thermally stable, electrically conductive porous sintered metal article which comprises a structure or framework of sintered base metal particles defining a network of interconnected pore channels randomly formed therein with active or conductive dispersoid particles distributed through the basic structure which are interlocked with adjacent base metal particles. In the preferred embodiment of the invention the conductive metal particles are present in an amount ranging from a trace amount up to about 30 weight percent of the sintered porous metal article.

In addition, the present invention concerns a method of producing a sintered metal article which is essentially thermally stable when used at elevated temperatures which includes the steps of preparing a blend of base metal particles and conductive dispersoid particles, forming said mixture into an article of the desired shape, and heating said formed article at sintered temperatures whereby a sintered article is obtained which is characterized by its thermal stability.

In the preferred practice of the invention, after the porous metal article has been sintered it is sometimes subjected to a compacting and then an annealing treatment, depending on contemplated applications.

DESCRIPTION OF THE PREFERRED EMBODIMENTS OF THE INVENTION

Base metal particles used in the practice of the invention can be made of any metal. Preferably such metal is one selected from the group consisting of nickel, iron, cobalt and mixtures thereof. In this regard, it is to be noted that more than one base metal or alloy of base metals may be utilized in the practice of the invention.

In the practice of the invention it has been found to be preferable to utilize base metal particles having a particle size ranging from about 0.1 to about 200 microns.

The active or conductive dispersoid particles used in the practice of the instant invention must be both refractory and conductive. Preferably, such particles are fashioned from a metal selected from the group consisting of chromium, molybdenum, tungsten, and mixtures thereof. Like the base metal particles, dispersoid particles of different metals or alloys can be utilized in the practice of the invention. Essentially, all that is required is that the dispersoid particles are (1) conductive, refractory, and capable of interlocking with adjacent base metal particles to form a unitary porous mass and (2) do not form a liquid phase during sintering.

In the practice of the invention is preferred to utilize dispersoid particles having a particle size distribution ranging from about 0.01 to about 50 microns.

The dispersoid particles in the starting mixture should be as small as possible to prevent their interference with the pore channel network with the only limitation on minimum size being the practical limit of the availability of sizes below 0.01 microns. It has been noted that dispersoid particles are desirably less than one-third the size of the pore channels. For larger sizes, the particles tend to block and close many of the pores to the detriment of usable pore volume. To ensure that the dispersoid particles in the materials of the invention are within these limits, there must be taken into account the tendency of many particles to grow during sintering. When such growth occurs, the dispersoid particles in the initial mixture prior to processing must naturally be smaller than the aformentioned sizes. Such growth can readily be compensated for by workers skilled in the art.

Base metal particles and dispersoid particles can be mixed together by any convenient means. In practice, it is preferred to use a V-twin shell-type of blender. The exact duration of blending is not critical. All that is required is that the materials are uniformly mixed.

The preferred mixture of base metal and dispersoid particles should range from about 95 to about 70 weight percent base metal and from about 5 to about 30 weight percent dispersoid particles.

The mixture of base particles and dispersoid particles can be formed into any desired shape by conventional techniques which are known to the art and will not be discussed herein in detail. The initial powder mixture should be such as to ensure uniform distribution of the dispersoid particles at the surfaces of the metal particles during formation of the green compact. This necessitates the formation of a uniform mixture wherein the dispersoid particles are located at or on the surfaces of the metal particles. No significant separation of the phases should occur causing some metal particles to be devoid of or have less dispersoid on their surfaces than others. Agglomeration of the dispersoid should also be avoided in the mixture. The relative concentration and sizes of the metal and dispersoid powders must naturally be such as to produce, upon further processing, the desired microstructure in the finished body.

In the preferred practice of the invention, articles are formed by filling a mold with the desired amount of material. Obviously, there are many ways in which the desired article can be fabricated.

The pore size of channels in the finished product is influenced not only by the concentrations and sizes of metal and dispersoid particles and sintering conditions but also by the degree of compaction experienced in forming the green compact. The compact may be formed by any of the various well-known techniques, including uni- or multidirectional die pressing, isostatic pressing, powder rolling, extruding and roll-bar molding. Various degrees of compaction are achieved in these processes, resulting in a variety of pore size ranges in the green compact.

The sintering of the formed powdered metal articles is preferably accomplished in a sintering furnace having an inert or reducing atmosphere, usually hydrogen. The sintering temperature depends on the type of metal particles utilized for both the base metal and the dispersoid particles. Sintering is usually carried out at a temperature which is approximately 75% of the melting point of the base metal. It being preferred that when nickel is employed as the base metal and chromium as the dispersoid the sintering temperature should range from about 1900° F. to about 2050°. The sintered article is usually cooled to about room temperature before it is removed from the furnace.

In the preferred practice of the invention the sintered article is then compacted, if required, by any conventional means to form an article having the desired degree of porosity. In the preferred practice of the invention, it is desirable to have a porosity in the final article of about 55 to about 85%. This article is then subjected to an annealing treatment, if required. The exact temperature and duration of annealing depends on the materials used to form the porous metal article.

In addition to the foregoing, another method for obtaining the desired mixture of base metal particles and dispersoid particles is realized by depositing the dispersoid on the surface of the base metal particles by chemical means. The process described by N. J. Grant in "Powder Metallurgy," volume 10, pp. 1 through 12, and also in U.S. Pat. No. 3,175,904, issued Mar. 30, 1965, are particularly effective in forming initial mixtures by chemical means.

Specific examples of procedures used in making materials and articles of manufacture of the invention are given below. These examples are to be considered as illustrative only and not as limiting in any manner the scope and spirit of the invention as defined by the appended claims.

EXAMPLE 1

About 90 grams of nickel having a particle size distribution ranging from about 3 microns to about 7 microns was mixed with about 10 grams of chromium having a particle size distribution ranging from about 3 microns to about 5 microns in a V-twin shell-type of blender for about 10 minutes. The resultant mixture was essentially homogeneous and contained, in weight percent, about 90 nickel and about 10 chromium. This mixture was then screened through a 100-mesh screen and about 100 grams of the through-100-mesh material was placed into a 6" by 6" by 0.070" rectangular mold to form a porous compacted green metal body having an apparent density of about 1.3 g/cc. The molded green metal body was then placed in a sintering oven and sintered in a hydrogen atmosphere by heating first to a temperature of about 1400° F. for a period of about 15 minutes and then to a temperature of about 1950° F. for a period of about 15 minutes. The sintered metal article was then cooled to room temperature and subsequently compacted by mechanical means to a porosity of about 70%. It was then subjected to an annealing treatment by heating it in a hydrogen atmosphere to a temperature of about 1950° F. for a period of about 15 minutes.

The article, produced as above described was subjected to certain physical tests and found to be electrically conductive and to exhibit a porosity of about 70%, with a mean pore size of 5 microns.

The so-produced sintered porous metal article was then placed in an oven having a reducing atmosphere and heated at a temperature of about 1400° F. for a period of about 3,000 hours. Thereafter, the physical properties of the metal article were again measured with the result being that essentially no deterioration in such properties was observed. That is, the article was still highly electrically conductive and evidenced the same general physical properties set forth above. There was no further sintering due to this high temperature testing.

Due to its extreme stability, together with its electrical conductivity, the foregoing article finds utility as an electrode which is especially adapted for use in a high temperature fuel cell.

EXAMPLE 2

About 90 grams of nickel having a particle size distribution ranging from about 3 to 7 microns was mixed with about 10 grams of alloyed chromium and tungsten having a particle size distribution ranging from about 9 to about 11 microns in a V-twin shell-type of blender for about 10 minutes. The resultant mixture was essentially homogeneous and contained, in weight percent, about 90% nickel and about 10% chromium and tungsten. This mixture was then screened through a 100-mesh screen and about 100 grams of the through-100-mesh material was placed into a 6" by 6" by 0.070" rectangular mold to form a porous compacted green metal body having an apparent density of about 1.3 g/cc. The molded green metal body was then placed in a sintering oven and sintered in a hydrogen atmosphere by heating first to a temperature of about 1400° F. for a period of about 15 minutes and then to a temperature of about 1950° F. for a period of about 15 minutes. The sintered metal article was then cooled to room temperature and subsequently compacted by mechanical means to a porosity of about 70%. It was then subjected to an annealing treatment by heating it in a hydrogen atmosphere to a temperature of about 1950° F. for a period of about 15 minutes.

The article, produced as above described was subjected to certain physical tests and found to be electrically conductive and to exhibit a porosity of about 70%, with a mean pore size ranging from about 7 microns.

The test procedure used to measure stability was similar to that used in Example 1.

EXAMPLE 3

About 90 grams of cobalt having a particle size distribution ranging from about 9 to about 15 microns was mixed with about 10 grams of chromium having a particle size distribution ranging from about 3 to about 5 microns in a V-twin shell-type of blender for about 10 minutes. The resultant mixture was essentially homogeneous and contained, in weight percent, about 90% cobalt and about 10% chromium. This mixture was then screened through a 100-mesh screen and about 100 grams of the through-100-mesh material was placed into a 6" by 6" by 0.070" rectangular mold to form a porous compacted green metal body having an apparent density of about 1.3 g/cc. The molded green metal body was then placed in a sintering oven and sintered in a hydrogen atmosphere by heating first to a temperature of about 1400° F. for a period of about 15 minutes and then to a temperature of about 1950° F. for a period of about 15 minutes. The sintered metal article was then cooled to room temperature and subsequently compacted by mechanical means to a porosity of about 70%. It was then subjected to an annealing treatment by heating it in a hydrogen atmosphere to a temperature of about 1950° F. for a period of about 15 minutes.

The article, produced as above described, was subjected to certain physical tests and found to be electrically conductive and to exhibit a porosity of about 70%, with a mean pore size ranging from about 6 microns.

The stability tests were similar to those of previous examples.

While there have been described herein what are, at present, considered to be the preferred embodiments of the invention, it will be obvious to those skilled in the art that various changes and modifications may be made therein without departing from the spirit and scope of the invention as hereinafter claimed.

What is claimed is:

1. A method of producing a porous sintered metal anode which is both electrically conductive and essentially physically thermally stable in that the porosity of said anode does not significantly change when subsequently exposed to a temperature approaching the original sintering temperature of said sintered metal anode which method comprises the steps of:

preparing a mixture of base metal particles consisting essentially of from about 70 to about 95 weight percent of a metal selected from the group consisting of nickel, cobalt, iron and mixtures thereof with said particles having a particle size ranging from about 0.1 microns to about 200 microns and from about 5 to about 30 weight percent of conductive dispersoid particles consisting essentially of a metal selected from the group consisting of chromium, tungsten, molybdenum and mixtures thereof with said particles having a particle size ranging from about 0.01 microns to about 50 microns;

forming said mixture into an anode of the desired shape;

heating said formed anode to a sintering temperature which is at least about 75% of the melting point of said base metal particles, said melting point being in degrees Fahrenheit, to form a sintered anode;

compacting said sintered anode to a degree sufficient to cause it to have a porosity ranging from about 55 to 85 percent; and subjecting said so-compacted anode to a temperature sufficient to anneal the same.

2. The method of claim 1 wherein said base metal is nickel.

3. The method of claim 1 wherein said dispersoid particles are composed of chromium.

* * * * *